United States Patent

[11] 3,575,066

| [72] | Inventors | William G. Livezey;<br>James J. Mooney, Jr.; William V. Phillips,<br>Indianapolis, Ind. |
|---|---|---|
| [21] | Appl. No. | 860,247 |
| [22] | Filed | Sept. 23, 1969 |
| [45] | Patented | Apr. 13, 1971 |
| [73] | Assignee | General Motors Corporation<br>Detroit, Mich. |

[54] TRANSMISSION
4 Claims, 1 Drawing Fig.

[52] U.S. Cl. .................................................. 74/720.5,
74/687
[51] Int. Cl. ................................................... F16h 37/06,
F16h 47/04
[50] Field of Search .......................................... 74/720.5,
687

[56] References Cited
UNITED STATES PATENTS

| 2,930,257 | 3/1960 | Christenson.................. | 74/720.5 |
| 3,199,376 | 8/1965 | DeLalio....................... | 74/720.5 |
| 3,492,891 | 2/1970 | Livezey....................... | 74/720.5 |

*Primary Examiner*—Arthur T. McKeon
*Attorneys*—W. E. Finken, A. M. Heiter and R. L. Phillips

ABSTRACT: A transmission having a hydrostatic propulsion drive unit combined with planetary gearing to provide in both forward and reverse a full hydrostatic drive in a low-speed range and two different hydromechanical drives in successively higher speed ranges with synchronous drive-establishing device shifting, the transmission with dual output also having a separate hydrostatic steer drive unit combined with the gearing to provide steering. The invention herein described was made in the course of work under a contract or subcontract thereunder with the Department of the Army.

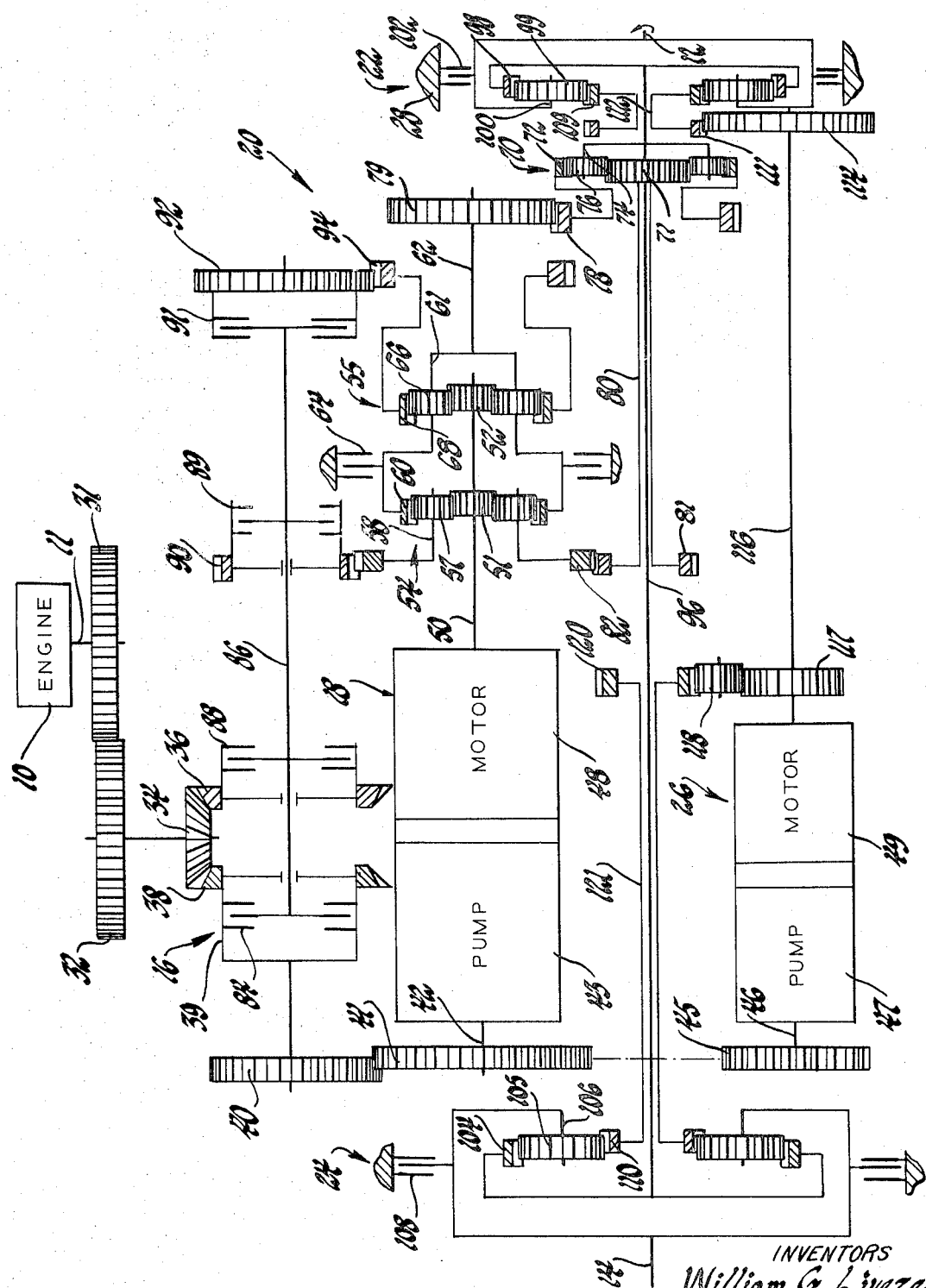

TRANSMISSION

The invention herein described was made in the course of work under a contract or subcontract thereunder with the Department of the Army.

This invention relates to vehicle transmissions and more particularly to a transmission providing full hydrostatic drive and hydromechanical drive.

The transmission according to the present invention, as illustrated in the preferred embodiment which has dual output for use in a track-laying vehicle, provides the same three-speed range drives in forward and reverse with full hydrostatic drive in the lowest speed range and split torque or hydromechanical drive in two successively higher speed ranges with hydrostatic steering provided in all speed ranges. Propulsion drive is by a single hydrostatic propulsion drive unit acting with planetary range gearing which provides synchronized drive establishments at optimum shift points. In the planetary range gearing, two planetary gear sets serially provide for the low-speed range drive which is the full hydrostatic drive. The intermediate speed range drive is provided by one of these two gear sets receiving mechanical drive from the transmission input and hydromechanical drive from the other gear set. The high-speed range drive is provided by the above-mentioned one gear set receiving two hydromechanical drives, one of these drives being from the other gear set and the other of these drives being from a third planetary gear set. This compounding of hydromechanical drives in the highest speed range drive extends the transmission's speed ratio coverage without extending the hydrostatic propulsion drive unit's speed ratio coverage. The single output from the above arrangement is delivered to like planetary steer units which also serve as output gearing and deliver their separate outputs as propulsion drives to the vehicle's two tracks. Steering is provided by an input driven hydrostatic steer drive unit which provides drive to the planetary steer units to effect controlled differential steering.

An object of the present invention is to provide a new and improved transmission.

Another object is to provide a transmission providing a full hydrostatic drive, a hydromechanical drive and a compound hydromechanical drive.

Another object is to provide in a dual output transmission a single hydrostatic propulsion drive unit cooperating with planetary gearing including output gearing to provide both a full hydrostatic drive in a low-speed range and hydromechanical drive in an intermediate speed range and cooperating with additional planetary gearing to provide a compound hydromechanical drive in a high-speed range with range shifting accomplished by drive-establishing devices speed synchronized at optimum shift points and a single hydrostatic steer unit cooperating with the output gearing to provide differential steering in all the drives.

These and other objects of the invention will be more apparent from the following description and drawing of the preferred embodiment of the invention.

The drawing diagrammatically shows a dual output transmission according to the present invention.

The preferred embodiment of the transmission according to the present invention has dual output and provides the same three-speed range drives in forward and reverse with full hydrostatic drive in the lowest speed range and split torque or hydromechanical drive in two successively higher speed ranges. These propulsion drives are accomplished by a single hydrostatic propulsion drive unit cooperating with planetary gearing and steering is obtained with a hydrostatic steer drive which cooperates with the gearing, steering being of the controlled differential type.

Referring to the drawing, the preferred embodiment of the transmission according to the present invention is for operatively drivingly connecting a track-laying vehicle's engine 10 to the vehicle's two tracks. The transmission generally comprises an engine powered input shaft 11 powering a right and a left track-powering transmission output shaft 12 and 14 through a forward and reverse drive unit 16, a single hydrostatic propulsion drive unit 18, a synchronous shifting planetary-gearing arrangement 20 and a right and a left speed differential or steer planetary gear unit 22 and 24. A single hydrostatic steer drive unit 26 is combined with the steer units 22 and 24 for the steering operation. All of these components are suitably supported in a housing 28. Both hydrostatic drive units which have variable speed ratios may be of conventional design with each unit's pump having infinitely variable displacement and each unit's motor having either fixed or variable displacement, the speed and direction of the motor output being controlled by the hydrostatic drive unit's displacement control mechanism which may also be conventional.

Input to both the hydrostatic propulsion drive unit 18 and the hydrostatic steer drive unit 26 is provided by the input shaft 11 being connected to drive a spur gear 31. Gear 31 meshes with a spur gear 32 which is connected to drive a bevel gear 34 in the forward and reverse drive unit 16. Gear 34 meshes at diametrically opposite sides with a bevel gear 36 and a bevel gear 38. Continuous input drive to both of the hydrostatic drive units is provided by connecting the bevel gear 38 via a drum 39 to a spur gear 40. Gear 40 meshes with a spur gear 41 which is connected by a shaft 42 to drive pump 43 of the hydrostatic propulsion drive unit 18. Gear 41 meshes, as shown diagrammatically, with a spur gear 45 which is connected by a shaft 46 to drive pump 47 of the hydrostatic steer drive unit 26. Motors 48 and 49 of the respective hydrostatic drive units 18 and 26 may thus be powered by the engine.

Describing the propulsion portion of the transmission arrangement in further detail, the motor 48 of the hydrostatic propulsion drive unit 18 has its output shaft 50 connected to drive sun gears 51 and 52 of planetary gear sets 54 and 55, respectively, in the planetary-gearing arrangement 20. In planetary gear set 54, sun gear 51 meshes with pinions 57 carried by a carrier 58 which may be mechanically driven by the transmission input as described in more detail later. Pinions 57 mesh with a ring gear 60 which is connected by carrier 61 of gear set 55 to a shaft 62. A brake 64 is connected to brake ring gear 60, carrier 61 and shaft 62.

In gear set 55, sun gear 52 meshes with pinions 66 carried by carrier 61. Pinions 66 also mesh with a ring gear 68 which may be mechanically input driven as described in more detail later.

A planetary gear set 70 in the propulsion portion of the arrangement selectively receives hydrostatic drive for low-speed operation, both mechanical drive and hydromechanical drive for intermediate speed operation and two hydromechanical drives for high-speed operation. Gear set 70 comprises a sun gear 71, a ring gear 72 and an output carrier 74 carrying pinions 76 meshing with this sun gear and ring gear. The ring gear 72 is connected to a spur gear 78 which meshes with a spur gear 79 that is connected to shaft 62. Thus, ring gear 72 may be held by brake 64 or hydromechanically driven as described in more detail later. The sun gear 71 is connected by a sleeve shaft 80 to a spur gear 81 which meshes with a spur gear 82 that is connected to carrier 58 of gear set 54. Thus, sun gear 71 is hydrostatically driven via gear set 54 when brake 64 is engaged and may also be either mechanically driven from the transmission input or hydromechanically driven as described in more detail later.

Mechanical drives to gear sets 54, 55 and 70 are provided through the forward and reverse drive unit 16. The forward and reverse drive unit 16 has, in addition to those components previously described, a forward drive clutch 84 whose drive members are connected to drum 39 and are thus connected to rotate with bevel gear 38. The driven member of forward drive clutch 84 is connected to the left-hand end of a countershaft 86 which extends freely through bevel gear 38 and also through the opposed bevel gear 36 as shown. A reverse drive clutch 88 has its drive members secured to bevel gear 36 and its driven member connected to countershaft 86 at an intermediate point. Thus when the forward drive clutch 84 is engaged, the countershaft 86 is powered by the transmission input in one direction and, alternatively, when the reverse drive clutch 88 is engaged, the countershaft 86 is powered in the opposite direction.

Further describing the mechanical drives to gear sets 54 and 70, a clutch 89 arranged about countershaft 86 is for connecting this countershaft to a spur gear 90. Gear 90 meshes with the gear 82 and thus mechanical drive from the transmission input is made available to both the carrier 58 of gear set 54 and the sun gear 71 of gear set 70. The mechanical drive to gear set 55 is provided by a clutch 91 which is arranged about countershaft 86 and on engagement connects this countershaft to a spur gear 92. Gear 92 meshes with a spur gear 94 which is connected to ring gear 68 of gear set 55.

Drive to the tranmission's two output shafts 12 and 14 is provided by connecting the output carrier 74 of gear set 70 to a shaft 96. In the drives to the two output shafts 12 and 14, the right-hand end of shaft 96 is connected to ring gear 98 of the right steer planetary gear unit 22 which ring gear meshes with pinions 99 carried by a carrier 100 that is connected to the right output shaft 12. A vehicle brake 102 is connected to brake the right output shaft 12. Similarly, the left-hand end of shaft 96 is connected to ring gear 104 of the left steer planetary gear unit 24 which ring gear meshes with pinions 105 carried by a carrier 106 that is connected to the left output shaft 14, the left output shaft 14 being axially aligned with the right output shaft 12. A vehicle brake 108 is connected to brake the left output shaft 14. Sun gear 109 of the right steer unit 22 and sun gear 110 of the left steer unit 24 are operatively connected by a direction reversing gear train. This gear train comprises a spur gear 111 which is connected by a sleeve shaft 112 to sun gear 109 and is in mesh with a spur gear 114. Gear 114 is connected to the right-hand end of shaft 116. Shaft 116 is connected near its left-hand end to a spur gear 117 which meshes with an idler gear 118. Idler gear 118 meshes with a spur gear 120 which is connected by a sleeve shaft 121 to sun gear 110 of the left steer unit 24. Thus, this gear train with idler gear 118 will provide reaction to the sun gears 109 and 110 when the ring gears 98 and 104 are driven. For steering, the shaft 116 of this gear rain is connected at its left-hand end to be driven by motor 49 of the hydrostatic steer drive unit 26.

Describing now a typical operation of this dual output transmission, for neutral either the forward drive clutch 84 or reverse drive clutch 88 may be engaged and all other drive establishing devices are disengaged to disconnect all power paths from the output shafts. In neutral, both of the hydrostatic drive units 18 and 26 are conditioned by their displacements so that they do not produce hydrostatic drive. Thus, in neutral both pumps 43 and 47 are motored by the engine 10 so that the hydrostatic propulsion drive unit 18 is readied for subsequent drive operation and the hydrostatic steer unit 26 is then available for steering which will now be described for this transmission condition.

In neutral, with no drive to shaft 96 and on operation of the hydrostatic steer drive unit 26 to power shaft 116 in either direction, the ring gears 98 and 104, since they are connected by the shaft 96, provide reaction in the steer units 22 and 24. The sun gears 109 and 110 are driven in opposite directions at the same speed by the gear train connection therebetween which is receiving drive from the hydrostatic steer drive unit 26. The carriers 100 and 106 and thus output shafts 12 and 14 are driven at reduced speed relative to these driving sun gears and in the same direction as their driving sun gear. Thus, the output shafts 12 and 14 are driven at the same speed in opposite directions and thereby produce steering, the direction of vehicle turning being determined by the rotational direction of shaft 116.

In the immediately following operational description of the three-speed range drives provided, the hydrostatic steer drive unit 26 is conditioned so that it does not power shaft 116, the description of steering operation in all speed range drives being deferred until later. In the low-speed range drive, either the forward drive clutch 84 or reverse drive clutch 88 is engaged, the brake 64 is engaged, and all other drive establishing devices are disengaged. For ease in understanding, it will be assumed that the engine 10 operates at a constant speed. Thus, the pump input shaft 42 of the hydrostatic propulsion drive unit 18 is driven at a constant speed which will be assumed to be its maximum value. In the low-speed range drive with brake 64 engaged, forward transmission drive which produces forward vehicle motion is obtained by operating the hydrostatic propulsion drive unit 18 to power the motor output shaft 50 and thus sun gear 51 of gear set 54 in what will be described as the reverse direction. Since ring gear 60 is held by brake 64, the carrier 58 is caused to rotate in the reverse direction at a reduced speed. The carrier 58 in turn drives the sun gear 71 of gear set 70 in the forward direction via gears 82 and 81. Since ring gear 72 of gear set 70 is held by brake 64, the carrier 74 and connected shaft 96 are caused to rotate in the forward direction at a reduced speed relative to sun gear 71. Thus, ring gears 98 and 104 of the steer units are driven in the forward direction while the gear train between sun gears 109 and 110 of the steer units causes these sun gears to provide reaction. The pinions 99 and 105 thus walk about sun gears 109 and 110 to drive carriers 100 and 106 and connected output shafts 12 and 14, respectively, in the forward direction at a reduced speed relative to the ring gear drives. Output speed in the low-speed range forward drive is increased by increasing the motor speed of the hydrostatic propulsion drive unit in its maximum value in the reverse direction.

During operation in the low-speed range forward drive, the carrier 58 of gear set 54 drives the driven members of clutch 89 in the forward direction via gears 82 and 90. Prior to an upshift in forward drive, the forward drive clutch 84 is engaged to drive shaft 86 in the forward direction. Thus, the drive and driven members of clutch 89 rotate in the same direction with the speed of the driven members increasing with increasing hydrostatic propulsion motor speed. This arrangement enables the sizes of the operating gears to be selected so that at maximum hydrostatic propulsion motor speed in the low-speed range drive, the speed of the driven members of clutch 89 has increased to that of the drive member so that there is no relative speed between the members of this clutch and thus this clutch is speed synchronized.

A shift from low to an intermediate speed range forward drive is preferably accomplished when the above speed synchronous condition of clutch 89 is reached in the low speed range forward drive. The clutch 89 is than engaged and then brake 64 is released while the forward drive clutch 84 remains engaged. In the intermediate speed range forward drive, power is transmitted hydrostatically to first drive sun gear 51 of gear set 54 in the reverse direction and mechanical drive is now provided from the transmission input to drive carrier 58 of this gear set in the reverse direction and also to drive sun gear 71 of gear set 70 in the forward direction, the latter mechanical drive being through gears 82 and 81. The mechanical drive and hydrostatic drive are combined by gear set 54 to provide a hydromechanical drive that drives ring gear 60 in the reverse direction. The ring gear 60 in turn drives the ring gear 72 of gear set 70 in the forward direction. The mechanical drive and hydromechanical drive are combined by the gear set 70 to drive shaft 96 and thus output shafts 12 and 14 in the forward direction. In the intermediate speed range forward drive, the reverse speed component of sun gear 51 subtracts from the reverse speed component of carrier 58 in the drive they cooperatively provide to ring gear 60. Thus, the reverse speed of sun gear 51 subtracts from the speed of the hydromechanical drive to ring gear 72 and therefore from the transmission output speed. Transmission output speed in the intermediate speed range forward drive is increased by reducing hydrostatic propulsion motor speed to zero and then increasing the speed to maximum motor speed in the forward direction, the forward motor speed providing sun gear 51 with an additive speed component. Downshifting from the intermediate speed range forward drive to the low-speed range forward drive also occurs with a speed synchronous condition at brake 64 by the drive to ring gear 60 from sun gear 51 and carrier 58 which drive reduces this ring gear's speed to zero at maximum motor speed in the reverse direction in the intermediate speed range drive.

During operation in the last half of the intermediate speed range forward drive, the sun gear 52 of gear set 55 is being driven in the forward direction by the hydrostatic propulsion motor 48 and the carrier 61 of this gear set is rotating with ring gear 60 and shaft 62 in the reverse direction. These rotations of sun gear 52 and carrier 61 cause ring gear 68 to rotate in the reverse direction. The ring gear 68 in turn drives the driven members of clutch 91 in the forward direction via gears 94 and 92 which is the same direction that the drive member of this clutch is being driven by the transmission input. This arrangement enables the sizes of the operating gears to be selected so that at maximum hydrostatic propulsion motor speed in the forward direction in the intermediate speed range drive, the drive and driven members of clutch 91 rotate at the same speed and therefore this clutch is speed synchronized.

The shift from intermediate to a high-speed range forward drive is preferably accomplished when the above speed synchronous condition of clutch 91 is reached in the intermediate speed range forward drive. The clutch 91 is then engaged and then clutch 89 is released while the forward drive clutch 84 remains engaged. Mechanical drive and hydrostatic drive are now combined by gear set 55, the mechanical drive being provided to ring gear 68 through clutch 91 and gears 92 and 94 to drive this ring gear in the reverse direction. The sun gear 52 rotates in the forward direction at the initiation of this transmission drive and therefore the speed of the hydrostatic propulsion motor drive subtracts from that of the ring gear 68 in the drive they cooperatively provide to drive carrier 61 in the reverse direction. The carrier 61, which is thus hydromechanically driven, in turn drives ring gear 72 of gear set 70 in the forward direction. The hydromechanically driven carrier 61 also drives ring gear 60 of gear set 54 in the reverse direction while the sun gear 51 of this gear set is being hydrostatically driven in the forward direction at the initiation of this transmission drive. This hydrostatic drive and hydromechanical drive are combined by gear set 54 to provide a hydromechanical drive that drives carrier 58 in the reverse direction. The carrier 58 in turn drives the sun gear 71 of gear set 70 in the forward direction. The two hydromechanical drives thus received by gear set 70 are combined or compounded to drive shaft 96 and thus output shafts 12 and 14 in the forward direction, this compounding of hydromechanical drives providing a larger speed ratio coverage than the hydrostatic drive and hydromechanical drive in the lower speed ranges. In the high-speed range forward drive, the forward speed components of the sun gears 51 and 52 subtract from the speed of the hydromechanical drives to sun gear 71 and ring gear 72 and therefore from the transmission output speed. Thus, output speed in the high-speed range forward drive is increased by reducing hydrostatic propulsion motor speed from the maximum value in the forward direction to zero and then increasing this speed to the maximum value in the reverse direction, the reverse motor speed providing sun gears 51 and 52 with additive speed components. Downshifting from high to the intermediate speed range forward drive also occurs with a speed synchronous condition at clutch 89 by the drive to carrier 58 in the high-speed range forward drive.

Three-speed range drives with synchronous shifting are also provided in reverse. These drives are effected by engaging the reverse drive clutch 88 instead of the forward drive clutch 84, operating the mechanical drive-establishing devices in the manner previously described and operating the hydrostatic propulsion drive unit 18 in an inverted manner from that previously described. Thus, the reverse drives provide the same speed range coverage as the forward drives.

Describing now the steering operation, in all of the speed range drives in both forward and reverse steering of the differential type is provided by operation of the hydrostatic steer drive unit 26 to drive shaft 116. With shaft 116 now being driven in either the forward or reverse direction, the sun gears 109 and 110 which provided only reaction before are now caused to rotate in opposite directions at the same speed. For example, when sun gear 109 is driven in the same direction as ring gear 98 by the hydrostatic steer drive unit 26, its speed component adds to that of ring gear 98 and thus increases the speed of output shaft 12 while the speed component of sun gear 110 subtracts from that of ring gear 104 to decrease the speed of output shaft 14 by the same amount that the speed of shaft 12 has been increased. Alternatively, the speed of output shaft 14 can be increased while the speed of output shaft 12 is decreased to steer in the opposite direction.

It will be understood that while the transmission has been illustrated with dual output for use in a track-layng vehicle, the transmission can also be adapted to a vehicle requiring only one transmission output. This may be accomplished by taking output directly from shaft 96, this shaft then serving as the transmission's output shaft.

The above-described preferred embodiment is illustrative of the invention which may be modified within the scope of the appended claims.

We claim:

1. In a transmission the combination of an input shaft; an output shaft; variable speed ratio hydrostatic drive means drivingly connected to said input shaft; first and second planetary gear means drivingly connected to each other and to said hydrostatic drive means; third planetary gear means drivingly connected to said first planetary gear means, said second planetary gear means and said output shaft; selectively operable first drive-establishing means for selectively providing reaction in both said first planetary gear means and said third planetary gear means to establish a drive from said hydrostatic drive means through said first planetary gear means and then through said third planetary gear means to said output shaft to provide a low-speed range drive between said input shaft and said output shaft; first mechanical drive train means including selectively operable second drive-establishing means for selectively drivingly connecting said input shaft to both said first planetary gear means and said third planetary gear means to establish a hydromechanical drive from first planetary gear means to said third planetary gear means and also a mechanical drive from said input shaft to said third planetary gear means with said third planetary gear means combining the hydromechanical drive and mechanical drive to drive said output shaft to provide an intermediate speed range drive between said input shaft and said output shaft; and second mechanical drive train means including third drive-establishing means for selectively drivingly connecting said input shaft to said second planetary gear means to establish a hydromechanical drive from said second planetary gear means to said third planetary gear means and also a hydromechanical drive from said first planetary gear means to said third planetary gear means with said third planetary combining these two hydromechanical drives to drive said output shaft to provide a high-speed range drive between said input shaft and said output shaft and whereby the speed ratio in all said speed range drives is varied by varying the speed ratio of said hydrostatic drive means.

2. The transmission set forth in claim 1 and each said planetary gear means comprising a sun gear, a ring gear and a carrier carrying a pinion in mesh with said sun gear and said ring gear; the sun gear of both said first and second planetary gear means drivingly connected to said hydrostatic drive means; the ring gears of said first and third planetary gear means and the carrier of said second planetary gear means all being drivingly connected; the carrier of said first planetary gear means drivingly connected to the sun gear of said third planetary gear means; the carrier of said third planetary gear means drivingly connected to said output shaft; said first drive-establishing means comprising a brake operatively connected to the ring gears of said first and third planetary gear means; said second drive-establishing means comprising a clutch which is operable to drivingly connect said input shaft to the carrier of said first planetary gear means and the sun gear of said third planetary gear means; said third drive-establishing means comprising a clutch which is operable to drivingly connect said input shaft to the ring gear of said second planetary gear means.

3. The transmission set forth in claim 1 and forward and reverse drive means for selectively providing a forward drive and a reverse drive between said input shaft and both said mechanical drive means.

4. The transmission set forth in claim 3 and a pair of steer planetary gear means each having a sun gear member, a ring gear member and a carrier member carrying a pinion meshing with said sun gear member and said ring gear member; means drivingly connecting said output shaft to one pair of like members of said steer planetary gear means; direction reversing gear train means operatively connecting another pair of like members of said steer planetary gear means; variable speed ratio steer hydrostatic drive means for operatively drivingly connecting said input shaft to said another pair of like members of said steer planetary gear means whereby the remaining pair of like members, of said steer planetary gear means provide two output drives having equal speed on establishment of said speed range drives with a differential speed effected between said output drives to produce steering whenever said steer hydrostatic drive means drives said direction reversing gear train wherein said differential speed is varied by varying the speed ratio of said steer hydrostatic drive means.